(12) United States Patent
Gotou et al.

(10) Patent No.: US 9,151,319 B2
(45) Date of Patent: Oct. 6, 2015

(54) MOUNTING STRUCTURE (71) Applicant: YAZAKI CORPORATION, Tokyo (JP)

(72) Inventors: Hiroki Gotou, Shizuoka (JP); Takanori Kawai, Aichi (JP); Yoshiyuki Ishihara, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 140 days.

(21) Appl. No.: 13/856,900

(22) Filed: Apr. 4, 2013

(65) Prior Publication Data
US 2013/0266399 A1 Oct. 10, 2013

(30) Foreign Application Priority Data

Apr. 6, 2012 (JP) ................................. 2012-087175

(51) Int. Cl.
*F16B 43/00* (2006.01)
*B60R 16/02* (2006.01)
*F16B 5/02* (2006.01)
*F16B 43/02* (2006.01)

(52) U.S. Cl.
CPC ........... *F16B 43/003* (2013.01); *B60R 16/0215* (2013.01); *F16B 5/025* (2013.01); *F16B 43/02* (2013.01)

(58) Field of Classification Search
CPC ....................................................... F16B 43/00
USPC .......... 411/531, 546, 547; 174/68.1, 68.3, 92, 174/99 R; 361/826; 248/49, 65, 73, 74.4; 138/108, 112; 16/2.1
See application file for complete search history.

(56) References Cited

U.S. PATENT DOCUMENTS 4,179,977 A * 12/1979 van Buren, Jr. ................ 411/182
4,971,500 A * 11/1990 Benoit et al. .................. 411/182
5,500,179 A * 3/1996 Onishi et al. .................. 264/400

FOREIGN PATENT DOCUMENTS

JP 2008-304023 A 12/2008

\* cited by examiner

*Primary Examiner* — Roberta Delisle
(74) *Attorney, Agent, or Firm* — Kenealy Vaidya LLP (57) ABSTRACT

A mounting structure includes a resin member that includes a mounting portion having a mounting hole, and a reinforcing member that has a insertion hole through which a fastening member is inserted for mounting the resin member on a bearing surface of a mounting target member. A mounting surface of the resin member is inclined so that the axis direction of the insertion hole of the reinforcing member coincides with a fastening direction of the fastening member to the mounting target member. The mounting hole of the mounting portion has a polygonal shape.

20 Claims, 7 Drawing Sheets

MOUNTING STRUCTURE

BACKGROUND

The present disclosure relates to a mounting structure of a resin member suitable for mounting a resin molded product which is used in, for example, fixing a wire harness or the like to a vehicle.

For example, when a wire harness or the like is fixed to a vehicle, a mounting bracket such as a protector, which is a resin molded product, is used in many cases. In this case, a screw shaft portion of a bolt is inserted through a bolt insertion hole of the mounting bracket, the mounting bracket is fastened to a bearing surface of a vehicle body by the bolt, and thus the wire harness or the like is fixed to a vehicle body side member through the mounting bracket. In addition, there is a case where a screw shaft portion is provided in the vehicle body side member and then a nut is fastened to the screw shaft portion so as to fasten the mounting bracket to the vehicle body.

However, there is a case where a breakage due to the fastening of a bolt or a nut occurs in this mounting bracket. In order to prevent this breakage due to the fastening of a bolt or a nut, for example, a mounting structure of a synthetic resin component disclosed in JP-A-2008-304023 has been known in which a mounting bracket is reinforced by inserting a cylindrical metal collar into the inner circumference of a bolt insertion hole.

As described above, in the mounting structure of a synthetic resin component disclosed in JP-A-2008-304023, the breakage due to the fastening of a bolt or a nut is prevented by the reinforcement using the cylindrical metal collar.

However, for example, when a screw hole formed on the vehicle body side member is orthogonal to the bearing surface of the vehicle body side member, an insertion direction of the bolt inserted through the bolt insertion hole of the mounting bracket coincides with a fastening direction of the bolt to the screw hole of the bearing surface. In this case, for example, in the mounting surface of the mounting bracket, which is directed to the bearing surface of the vehicle body side member, it is not necessary to perform a process in which the insertion direction of the bolt inserted through the bolt insertion hole of the mounting bracket coincides with the fastening direction of the bolt to the screw hole of the bearing surface.

Accordingly, even in a case of using the cylindrical metal collar, at the time of fastening by the bolt, the entire opening end face of the metal collar, which is directed to the bearing surface of the vehicle body side member, comes into surface contact with the bearing surface of the vehicle body side member and thus a gap is not generated between the opening end face of the metal collar and the bearing surface of the vehicle body side member.

Incidentally, when a gap is generated between the opening end face of the metal collar, which is directed to the bearing surface of the vehicle body side member, and the bearing surface of the vehicle body side member at the time of fastening by the bolt, the fastening force of the bolt to the bearing surface of the vehicle body side member is weakened. In this case, rattle occurs in the mounting bracket and thus the fixing of a wire harness or the like to the vehicle body side member is not completely performed.

On the other hand, for example, when an axis of the screw hole formed on the vehicle body side member is not orthogonal to the bearing surface of the vehicle body side member, that is, the screw hole is formed to be inclined with respect to the bearing surface, the insertion direction of the bolt inserted through the bolt insertion hole of the mounting bracket does not coincide with the fastening direction of the bolt to the screw hole of the bearing surface. Therefore, it is not possible to fasten the bolt to the screw hole of the bearing surface. In addition, an example in which the screw hole is formed to be inclined with respect to the bearing surface is generally shown, for example, in a case where the bearing surface of the vehicle body side member is inclined.

SUMMARY

The present disclosure is made in consideration of the above-described circumstance, and an object thereof is to provide a mounting structure of a resin molded product that enables a resin molded product to be reliably mounted on a bearing surface of a mounting target side even in a case where a fastening direction of a bolt to the bearing surface of the mounting target side is not orthogonal to the bearing surface.

According to the present disclosure, there is provided a mounting structure comprising:

a resin member that includes a mounting portion having a mounting hole; and a reinforcing member that has a insertion hole through which a fastening member is inserted for mounting the resin member on a bearing surface of a mounting target member, and the reinforcing member being mounted in the mounting hole, wherein a mounting surface of the mounting portion, which faces the bearing surface of the mounting target portion, is inclined with respect to a direction perpendicular to an axis direction of the insertion hole so that the axis direction of the insertion hole of the reinforcing member coincides with a fastening direction of the fastening member to the mounting target member;

wherein the mounting hole of the mounting portion has a polygonal shape;

wherein an outer shape of the reinforcing member is substantially same as the polygonal shape of the mounting hole; and wherein an opening end face of the reinforcing member, which faces the bearing surface of the mounting target member, is inclined so as to be on the same plane with the mounting surface of the mounting portion.

For example, the mounting portion has a rear face which is opposite to the mounting surface, and the mounting surface is inclined with respect to the rear face.

For example, the outer shape of the reinforcing member is a square.

For example, the mounting portion has a thin part and a thick part which are adjacent to the mounting hole, the mounting hole being arranged between the thin part and the thick part. Also, the opening end part of the reinforcing member, which faces the bearing face of the mounting target portion, has a first opening end face, a second opening end face being opposed to the first opening end face through the insertion hole, a third opening end face, and a fourth opening end face, the third opening end face and the fourth opening end face being respectively connected to both end portions of the first opening end face and both end portions of the second opening end face. Also, the first opening end face is same in height as a position of the mounting surface on the thick part of the mounting portion. Also, the second opening end face is same in height as a position of the mounting surface on the thin part of the mounting portion, the second opening end face being lower than the first opening end face. Also, the third and fourth opening end faces are inclined downward in a direction toward the second opening end face from the first opening end face.

For example, an outer dimension of the reinforcing member is greater than an inner dimension of the mounting hole of the mounting portion.

For example, the reinforcing member is embedded in the mounting portion, and is integrally formed in the mounting portion.

For example, the reinforcing member is comprised of metal material.

By the above configurations, by mounting the reinforcing member having a polygonal outer shape on the mounting hole having a polygonal opening, it is possible to easily align the reinforcing member with the mounting hole and thus, after mounting, position deviation does not occur. In addition, since the mounting surface, which is directed to the bearing surface of the mounting portion, is inclined such that the insertion hole coincides with the fastening direction to the mounting target side and the opening end of the reinforcing member, which is directed to the bearing surface, is inclined so as to be on the same plane with the mounting surface of the mounting portion, it is possible to reliably bring the opening end of the reinforcing member, which is directed to the bearing surface at the time of fastening by the fastening member, into surface contact with the bearing surface without any gaps therebetween.

According to the above configurations, since the opening end of the reinforcing member, which is directed to the bearing surface, is reliably brought into surface contact with the bearing surface without any gaps therebetween, even in a case where the fastening direction of the fastening member to the bearing surface of the mounting target member is not orthogonal to the bearing surface, it is possible to reliably mount the resin molded product on the bearing surface of the mounting target member.

BRIEF DESCRIPTION OF THE DRAWINGS

The above objects and advantages of the present disclosure will become more apparent by describing in detail preferred exemplary embodiments thereof with reference to the accompanying drawings, wherein:

FIGS. 3A to 3C are views illustrating the metal collar of FIG. 1.

FIGS. 7A and 7B are views illustrating a cylindrical metal collar of the related art.

DETAILED DESCRIPTION OF EXEMPLARY EMBODIMENTS

As described in the background, in a case that an axis direction of the screw hole is formed to be inclined with respect to a direction perpendicular to the bearing surface of the vehicle side, it is necessary to incline the mounting surface of the mounting bracket, which is directed to the bearing surface of the vehicle body side member, such that the insertion direction of the bolt inserted through the bolt insertion hole of the mounting bracket coincides with the fastening direction of the bolt to the screw hole of the bearing surface. Incidentally, if a surface on the opposite side to the mounting surface of the mounting bracket is inclined, for example, a portion of the head of the bolt is floated on the surface on the opposite side to the mounting surface. Accordingly, it is necessary to incline the opening end face such that the opening end face of the cylindrical metal collar, which is directed to the bearing surface of the vehicle body side member, comes into surface contact with the bearing surface of the vehicle body side member at the time of fastening by the bolt.

For the cylindrical metal collar, there are cases where the metal collar is pressed into the bolt insertion hole of the mounting bracket and where the metal collar is set to a mold in advance at the time of insert molding and then is integrally molded. To address this circumstance, a case where the mounting surface of the mounting bracket, which is directed to the bearing surface of the vehicle body side member, is inclined and, further, the opening end face of the cylindrical metal collar is inclined so as to coincide with the bearing surface of the vehicle body side member will be discussed.

Figure 7A:
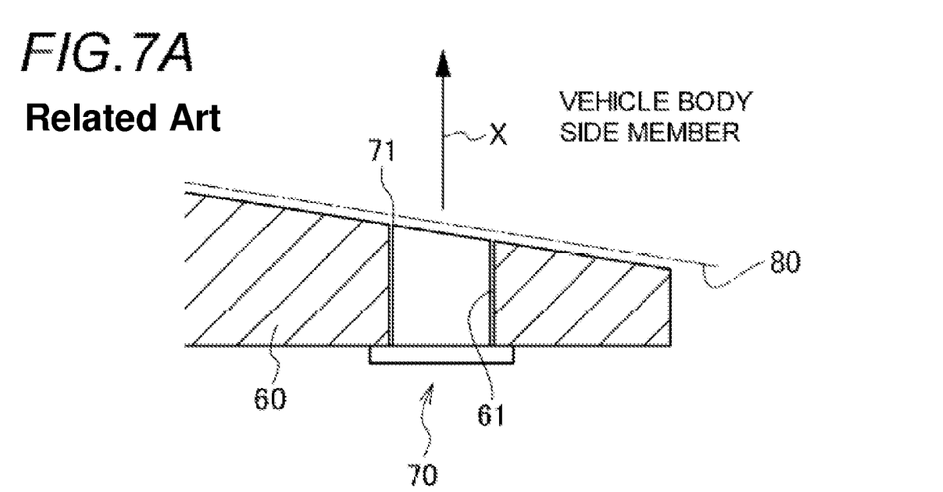
FIG. 7A is a cross-sectional view illustrating a case where a position deviation does not occur in the metal collar.

In other words, for example, as shown in FIG. 7A, a screw hole, which is not shown in the drawing, is formed on a bearing surface 80 of the vehicle body side member in a direction represented by the arrow x (fastening direction of the bolt). Here, when a cylindrical metal collar 70 is pressed into a bolt insertion hole 61 of a mounting bracket 60, it is necessary to align the opening end face of the metal collar 70 with the incline of the bearing surface 80 of the vehicle body side member while considering a mounting direction of the mounting surface of the mounting bracket 60, which is directed to the bearing surface of the vehicle body side member, on the bearing surface 80 of the vehicle body side member.

In this case, a top point (the highest position of the opening end face) 71 of the opening end of the metal collar 70 is aligned with the thick part of the mounting bracket 60 such that the opening end of the metal collar 70 is set to be on the same plane with the mounting surface of the mounting bracket 60, which is directed to the bearing surface of the vehicle body side member. In this way, at the time of fastening by the bolt, a gap is not generated between the opening end of the metal collar 70 and the bearing surface 80 of the vehicle body side member.

Figure 7B:
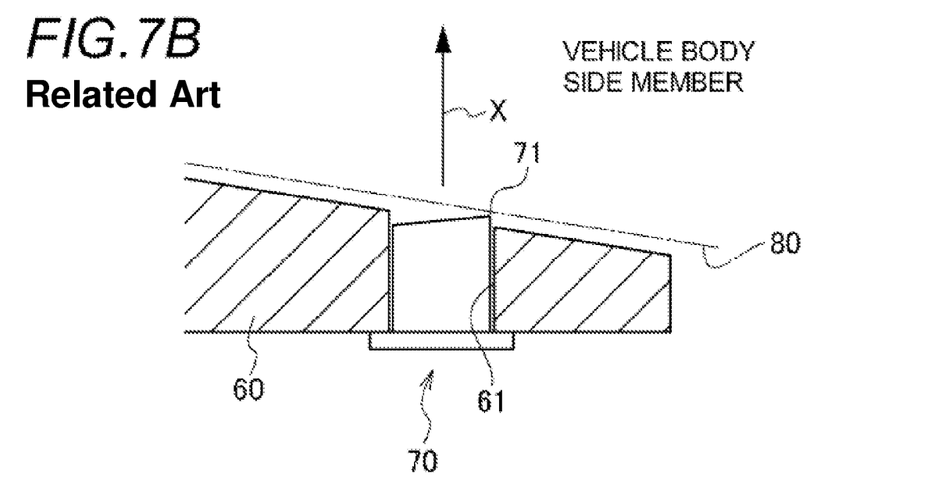
FIG. 7B is a cross-sectional view illustrating a case where a position deviation occurs in the metal collar.

On the other hand, for example, as shown in FIG. 7B, when the metal collar 70 is pressed into the bolt insertion hole 61 of the mounting bracket 60 in a state where the top point (the highest position of the opening end face) 71 of the opening end of the metal collar 70 is directed to the thin part of the mounting bracket 60, the top point (the highest position of the opening end face) 71 of the opening end face of the metal collar 70 protrudes from the mounting surface of the mounting bracket 60, which is directed to the bearing surface of the vehicle body side member.

In this case, at the time of fastening by the bolt, a gap is generated between a portion of the opening end face of the metal collar 70 and the bearing surface 80 of the vehicle body side member. Therefore, as described above, rattle occurs in the mounting bracket 60 and thus the fixing of a wire harness or the like to the vehicle body side member is not completely performed.

On the other hand, when the above-described metal collar 70 is set to a mold in advance and then is integrally molded, it is necessary to set the metal collar 70 to a cylindrical protrusion in the mold (a portion on which the above-described bolt insertion hole 61 is formed) such that the incline of the opening end face of the metal collar 70 coincides with the incline of the mounting surface of the above-described mounting bracket 60 which has been molded.

However, if resin is injected into a cavity of the mold, the metal collar 70, which is set to the cylindrical protrusion, is rotated due to the fluid pressure thereof. According to this, for example, in a similar way to FIG. 7B described above, the metal collar 70 is integrally molded in a state where the top point (the highest position of the opening end face) 71 of the opening end face of the metal collar 70 is directed to the thin part of the mounting bracket 60.

In this case, in a similar way to the above description, a gap is also generated between a portion of the opening end face of the metal collar 70 and the bearing surface 80 of the vehicle body side member. Therefore, as described above, rattle occurs in the mounting bracket 60 and thus the fixing of a wire harness or the like to the vehicle body side member is not completely performed.

To address this circumstance, there is a demand for developing a mounting structure of a resin molded product that enables the mounting bracket 60 to be reliably mounted on the bearing surface 80 of the vehicle body side member, for example, when an axis of a screw hole formed on the vehicle body side member is not orthogonal to the bearing surface 80 of the vehicle body side member, that is, even in a case where the screw hole is formed to be inclined with respect to the bearing surface 80.

Hereinafter, an embodiment of a mounting structure of a resin molded product according to the present disclosure will be described in detail with reference to FIG. 1 to FIG. 6. Moreover, hereinafter, the mounting structure of a resin molded product according to the present disclosure will be described based on a case where the mounting structure of a resin molded product according to the present disclosure is applied to a protector that is used in, for example, fixing a wire harness or the like to a vehicle and is a resin molded product. In addition, for a metal collar to be described below, there are cases where the metal collar is pressed into the protector, which has been molded, and where the metal collar is integrally molded in advance by insert molding. These cases will be described sequentially.

Figure 1:
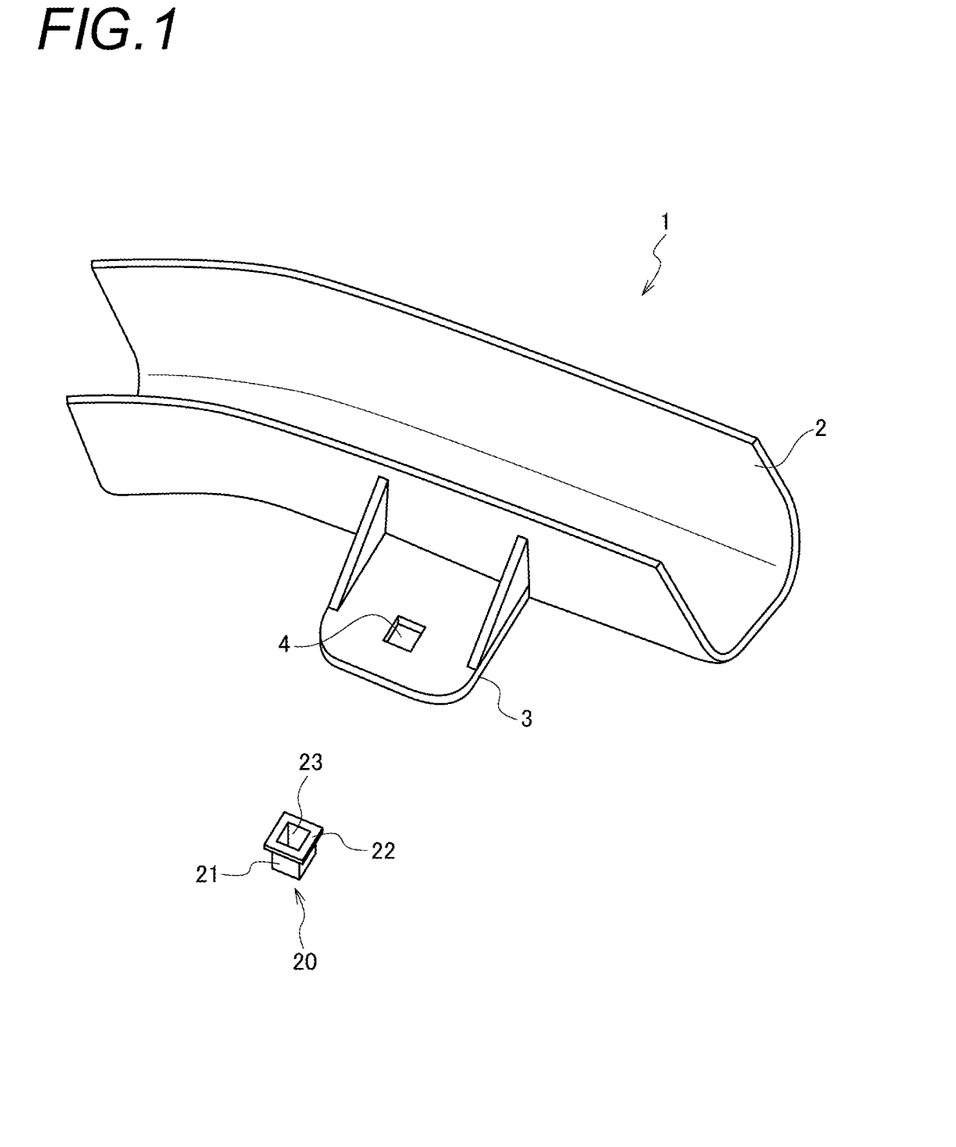
FIG. 1 is a view illustrating an embodiment of a mounting structure of a resin molded product according to the present disclosure and is a perspective view showing a protector and a metal collar.
Figure 2:
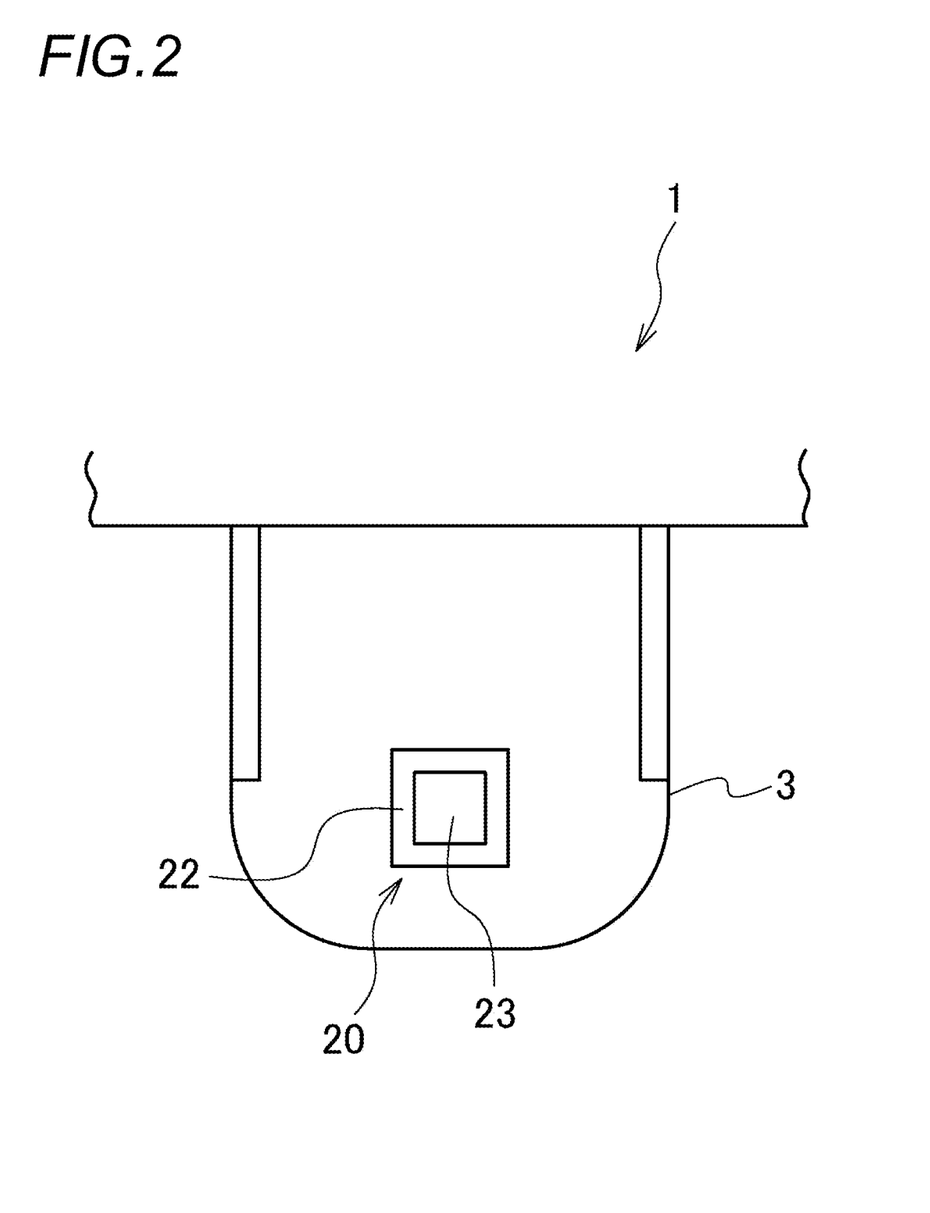
FIG. 2 is a plan view showing a mounting portion of the protector of FIG. 1.

First, a case where the metal collar is pressed into a mounting portion of the protector, which has been molded, will be described. That is, as shown in FIG. 1 and FIG. 2, a protector 1 (resin member) includes a protector main body 2 for holding a wire harness or the like (not shown in the drawing) and a mounting portion 3 to be mounted on a bearing surface 51 of a vehicle body panel 50 (mounting target member) shown in FIG. 6 by a bolt 30 (fastening member). A mounting hole 4 having a square opening, into which a reinforcing metal collar 20 (reinforcing member) is pressed, is formed on the mounting portion 3. In addition, a mounting surface 3a, which is a back surface of the mounting portion 3 and is shown in FIG. 3B, is inclined such that a screw insertion hole 23 (insertion hole) of the metal collar 20 coincides with a fastening direction g of the bolt 30 to the bearing surface 51 of the vehicle body panel 50 shown in FIG. 6.

Figure 6:
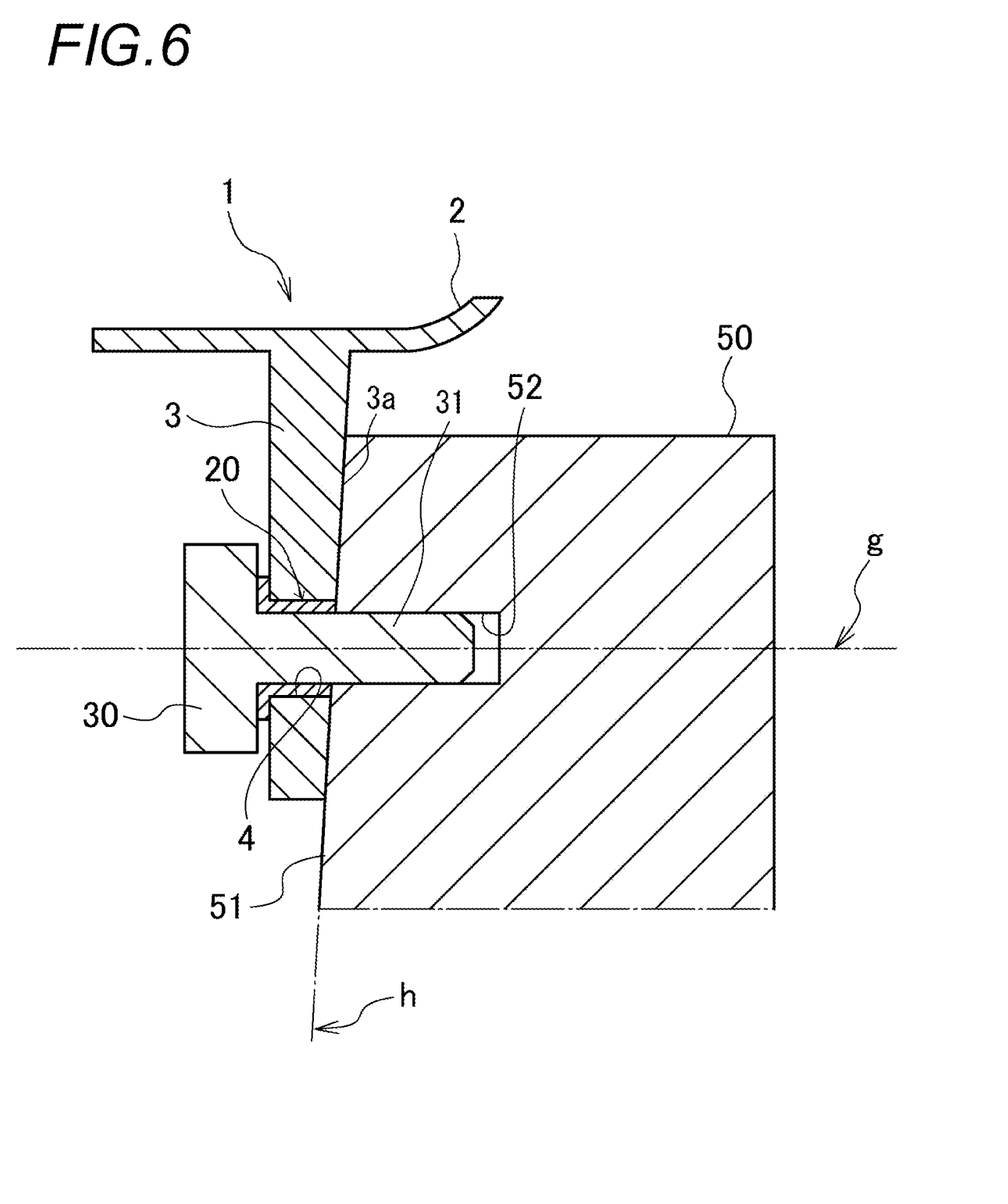
FIG. 6 is a cross-sectional view illustrating a case where the protector of FIG. 1 is mounted on a vehicle body side member.

The metal collar 20 is used for preventing the breakage of the mounting portion 3 due to the fastening of the bolt 30 shown in FIG. 6 or a nut (not shown in the drawing). The outer shape of the metal collar 20 is a square in a top plan view to coincide with the inner shape of the mounting hole 4 of the mounting portion 3 of the protector 10. In addition, the metal collar 20 includes a tube portion 21, which is pressed into the mounting hole 4 of the mounting portion 3 of the protector 1, a flange 22 which is engaged with the opening end portion of the mounting hole 4, and a screw insertion hole 23 through which a screw shaft portion 31 of the bolt 30 (shown in FIG. 6) is inserted.

Figure 3A:
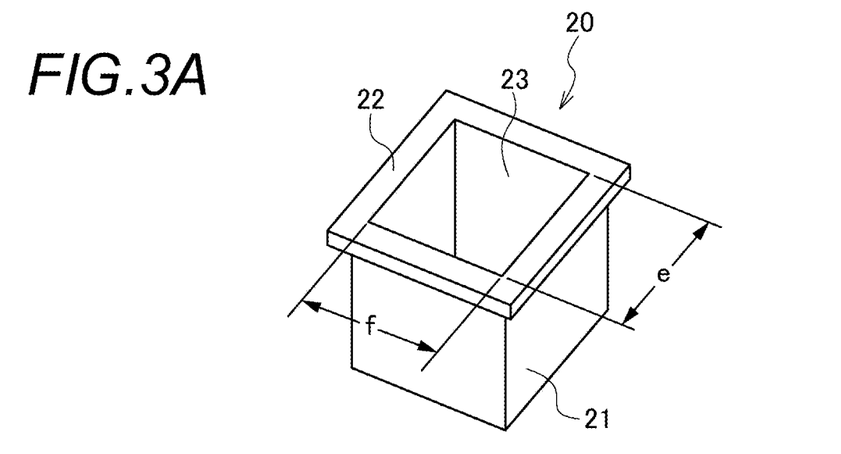
FIG. 3A is a perspective view showing the metal collar.

That is, in the metal collar 20, as shown in FIG. 3A, the flange 22 is provided in one of the opening ends of the square tube portion 21. In the tube portion 21 and the center of the flange 22, the screw insertion hole 23 is formed. Each of the dimensions e and f of the screw insertion hole 23 is approximately the same as a diameter of the screw shaft portion 31 of the bolt 30 shown in FIG. 6. According to these dimensions, when the screw shaft portion 31 of the bolt 30 is inserted through the screw insertion hole 23, rattle does not occur between the screw shaft portion 31 and the screw insertion hole 23.

Figure 3B:
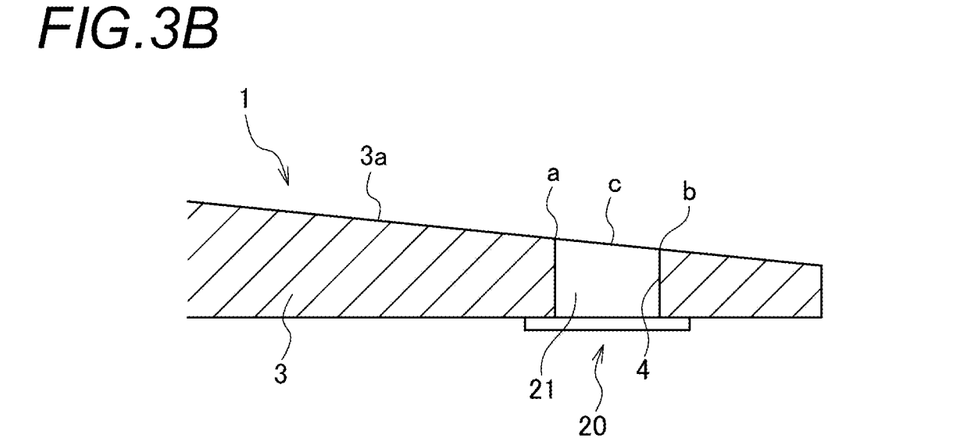
FIG. 3B is a cross-sectional view showing a state where the metal collar is pressed into a mounting hole of the mounting portion of the protector.
Figure 3C:
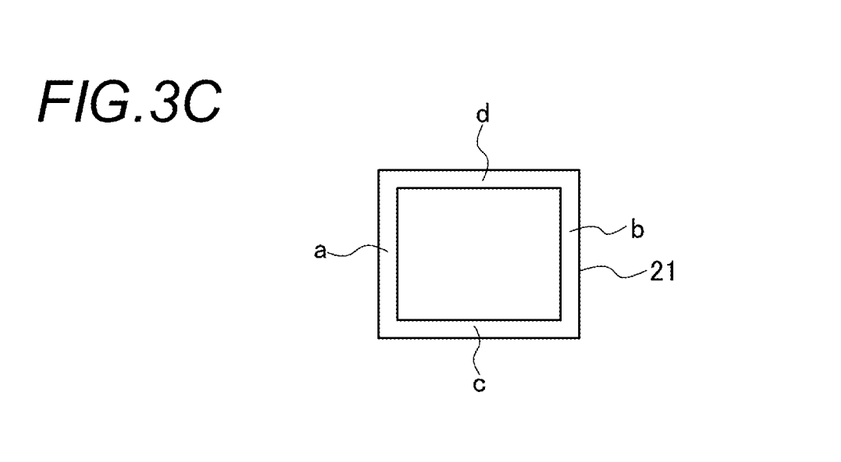
FIG. 3C is a plan view showing an opening end side which is directed to a bearing surface of the metal collar.

As shown in FIGS. 3B and 3C, the other opening ends of the metal collar 20 are inclined so as to coincide with the incline of the mounting surface 3a of the mounting portion 3 of the protector 1. In addition, the incline of the mounting surface 3a is formed so that the screw insertion hole 23 of the metal collar 20 coincides with the fastening direction g to the bearing surface 51 of the vehicle body panel 50 shown in FIG. 6.

Herein, among first to fourth opening end faces a to d, the first opening end face a is substantially same in height as a position of the mounting surface 3a on the thick part of the mounting portion 3 and the second opening end face b, which is opposed to the first opening end face a, is same in height as a position of the mounting surface 3a on the thin part of the mounting portion 3. Moreover, the third and fourth opening end faces c and d are inclined downward in a direction toward the second opening end face b from the first opening end face a. In other words, when the metal collar 20 is pressed into the mounting hole 4, the other opening ends of the metal collar 20 have a shape in which the other opening ends thereof are on the same plane with the mounting surface 3a of the mounting portion 3.

In the above-described configuration, when a wire harness or the like is fixed to the vehicle body side member, first, the square tube portion 21 of the metal collar 20 is pressed into the mounting hole 4, which has a square opening, of the mounting portion 3 of the protector 1 shown in FIG. 1. In this case, as described above, the first opening end face a of the tube portion 21 is directed to the thick part of the mounting portion 3 and the second opening end face b, which is opposed to the first opening end face a, is directed to the thin part of the mounting portion 3.

In this case, since the heights of the first opening end face a and the second opening end face b are different, it is possible to easily figure out the direction in which the metal collar 20 is pressed into the square mounting hole 4 of the mounting portion 3 and thus it is possible to press the tube portion 21 of the metal collar 20 into the mounting hole 4 without selecting a wrong direction. At this time, since the square tube portion 21 of the metal collar 20 is pressed into the mounting hole 4 having the same shape, the metal collar 20 is mounted on the mounting hole 4 without raffling or positionally deviating.

Figure 4:
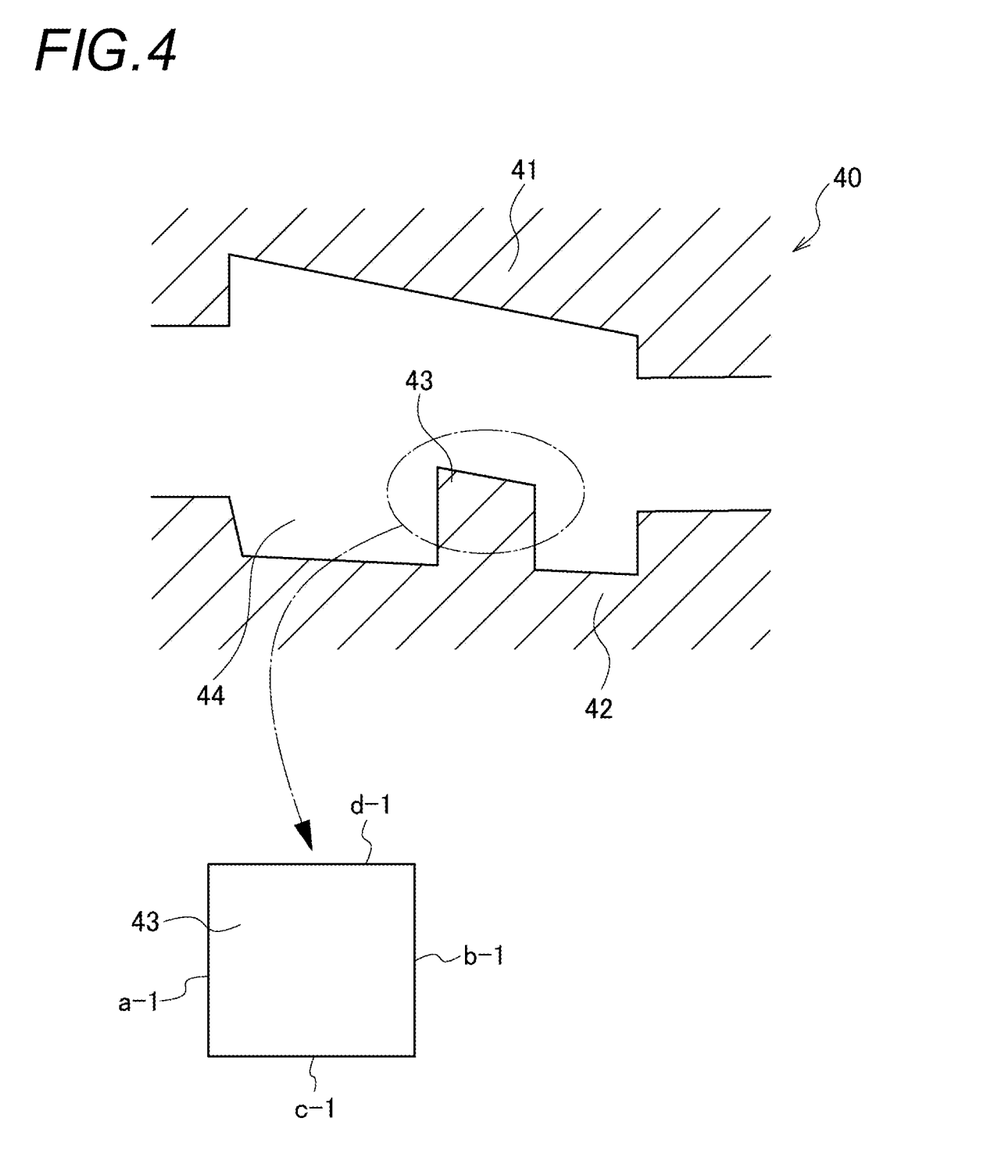
FIG. 4 is a cross-sectional view illustrating a case where the metal collar of FIG. 1 is integrally molded.

Next, a case where the metal collar 20 is integrally molded in advance by insert molding will be described. First, in FIG.

4, the reference numeral 40 denotes a mold schematically showing the molding of only the mounting portion 3 of the protector 1, the reference numeral 41 denotes an upper mold, and the reference numeral 42 denotes a lower mold. In addition, the reference numeral 43 denotes a protrusion for forming the square mounting hole 4 of the mounting portion 3 of the protector 1 described above. Moreover, the reference numeral 44 denotes a cavity to be filled with resin in order to form the protector 1 described above.

Herein, one lateral side a-1 of the protrusion 43 is same in height as a position of the mounting surface 3a on the thick part of the mounting portion 3, similarly to the first opening end face a of the tube portion 21 described above. An opposite side b-1, which is opposed to the one lateral side a-1, is same in height as a position of the mounting surface 3a on the thin part of the mounting portion 3, similarly to the second opening end face b of the tube portion 21 described above. The other lateral sides c-1 and d-1, which are the two remaining sides, are inclined downward in a direction toward the opposite side b-1 from the one lateral side a-1, similarly to the third and fourth opening end faces c and d of the tube portion 21 described above.

Figure 5:
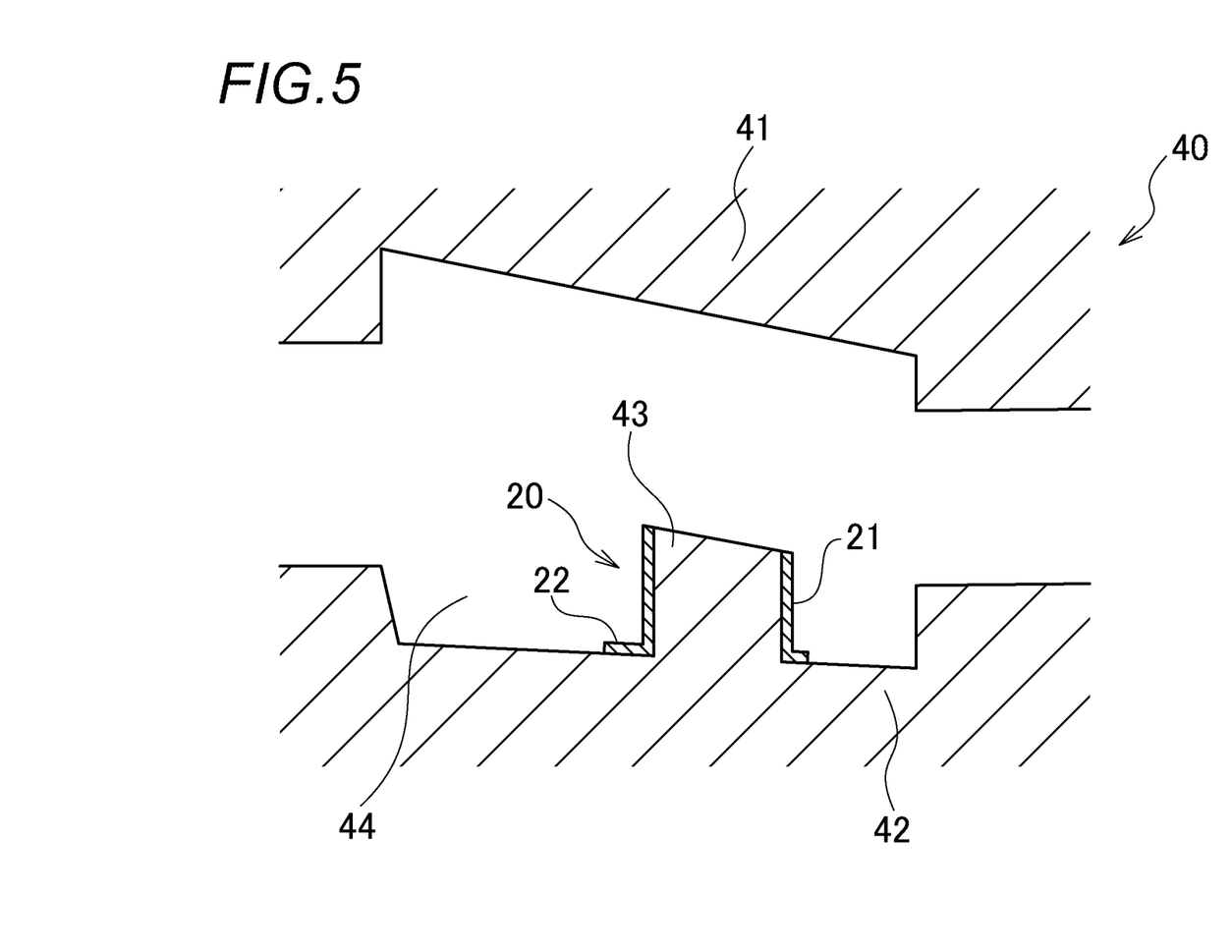
FIG. 5 is a cross-sectional view illustrating a case where the metal collar of FIG. 1 is integrally molded.

Then, when the metal collar 20 is mounted on the protrusion 43 of the lower mold 42, as shown in FIG. 4 and FIG. 5, the first opening end face a of the tube portion 21 is directed to the one lateral side a-1 of the protrusion 43 and the second opening end face b of the tube portion 21 is directed to the opposite side b-1 of the protrusion 43. According to this, since a direction in which the metal collar 20 is mounted on the protrusion 43 of the lower mold 42 is determined, it is possible to reliably mount the metal collar 20 on the protrusion 43 of the lower mold 42 without selecting a wrong direction. In addition, even in a case where resin is injected into the cavity 44 and thus the fluid pressure thereof is applied to the metal collar 20, since the metal collar 20 is mounted on the square protrusion 43, the metal collar 20 is not rotated and the position deviation does not occur.

Next, a case where the above-described protector 1, into which the metal collar 20 is pressed after molded, or the above-described protector 1, in which the metal collar 20 is integrally molded in advance by insert molding, is mounted on the vehicle body side member will be described.

First, as shown in FIG. 6, the bearing surface 51 of the vehicle body panel 50, which is a mounting target side, is inclined, for example, so as to protrude downward as shown by an incline direction h (having a predetermined inclined angle). In addition, in the bearing surface 51 of the vehicle body panel 50 of the vehicle body side member, a screw hole 52 for receiving the screw shaft portion 31 of the bolt 30 by fastening process, is formed. Here, since the bearing surface 51 of the vehicle body panel 50 is inclined, the fastening direction g of the bolt 30, which is the direction of the screw hole 52 of the bearing surface 51, is not orthogonal to the incline direction h of the bearing surface 51 of the vehicle body panel 50.

On the other hand, the mounting surface 3a of the mounting portion 3 of the protector 1 is inclined with respect to a direction perpendicular to an axis of the mounting hole 4 such that the screw insertion hole 23 of the metal collar 20 coincides with the fastening direction g thereof. In addition, as described above, in the metal collar 20 which is pressed into or integrally molded with the mounting hole 4 of the mounting portion 3, the first opening end face a of the tube portion 21 is directed to the thick part of the mounting portion 3 and the second opening end face b, which is opposed to the first opening end face a, is directed to the thin part of the mounting portion 3.

Therefore, as described in FIG. 3B, the other opening ends of the metal collar 20 are inclined to coincide with the incline of the mounting surface 3a of the mounting portion 3 of the protector 1. In other words, as described above, when the metal collar 20 is pressed into or integrally molded with the mounting hole 4, the other opening end sides of the metal collar 20 have a shape in which the other opening end sides thereof are on the same plane with the mounting surface 3a of the mounting portion 3.

According to this, when the mounting surface 3a of the mounting portion 3 of the protector 1 faces the bearing surface 51 of the vehicle body panel 50, the other opening ends of the metal collar 20 come into contact with the bearing surface 51 of the vehicle body panel 50 without any gaps.

Then, by inserting the bolt 30 through the mounting hole 4 of the mounting portion 3 of the protector 1 and thus fastening the screw shaft portion 31 to the screw hole 52, it is possible to reliably mount the protector 1 on the bearing surface 51 of the vehicle body side member. As a result, the fixing of a wire harness, which is not shown in the drawing, or the like to the vehicle body side member is completely performed.

As described above, in this embodiment, the mounting surface 3a, which is directed to the bearing surface 51 of the vehicle body side member, of the mounting portion 3 of the protector 1 is inclined such that the screw insertion hole 23 of the metal collar 20 coincides with the fastening direction g to the bearing surface 51 of the vehicle body panel 50, and the metal collar 20, which has a square outer shape and is inclined such that the opening end directed to the bearing surface 51 is on the same plane with the mounting surface 3a of the mounting portion 3, is pressed into or integrally molded with the mounting hole 4 having a square opening so as to be mounted thereon. Therefore, when the protector 1 is mounted on the bearing surface 51 by fastening the bolt 30, it is possible to bring the opening end, which is directed to the bearing surface 51, of the metal collar 20 into surface contact with the bearing surface 51 without any gaps therebetween. According to this, even in a case where the fastening direction g of the bolt 30 in the bearing surface 51 of the vehicle body side member, which is a mounting target side member, is not orthogonal to the bearing surface 51, it is possible to reliably mount the protector 1 on the bearing surface 51 of the vehicle body side member.

In this embodiment, the outer shape of the metal collar 20 has a square shape. However, the outer shape of the metal collar 20 is not limited thereto. Any shape may be used as long as it does not generate the position deviation when the metal collar 20 is pressed into or integrally molded with the mounting hole 4 of the mounting portion 3 of the protector 1. For example, the outer shape of the metal collar 20 may also be polygonal shapes such as a triangular shape and a pentagonal shape other than the square shape.

In this embodiment, a case where the protector 1 is mounted on the bearing surface 51 of the vehicle body side member by inserting the single bolt 30 through the screw insertion hole 23 of the metal collar 20 has been described, but the mounting of the protector 1 is not limited to this example. Even in a case where the screw shaft portion is provided in advance on the bearing surface 51 of the vehicle body side member, it is possible to reliably mount the protector 1 on the bearing surface 51 of the mounting target side in a similar way to the above-described case.

The present disclosure may also be applied to a protector or the like that is used in mounting power lines, signal lines and the like, in addition to the protector that is a resin molded product and is used in fixing a wire harness or the like to the vehicle, for example.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2012-087175 filed on Apr. 6, 2012, the contents of which are incorporated herein by reference.

What is claimed is:

1. A mounting structure comprising:
a resin member that includes a mounting portion having a mounting hole; and
a reinforcing member that has an insertion hole through which a fastening member is inserted for mounting the resin member on a bearing surface of a mounting target member, and the reinforcing member being mounted in the mounting hole,
wherein a mounting surface of the mounting portion, which faces the bearing surface of the mounting target portion, is inclined with respect to a direction perpendicular to an axis direction of the insertion hole so that the axis direction of the insertion hole of the reinforcing member coincides with a fastening direction of the fastening member to the mounting target member;
wherein the mounting hole of the mounting portion has a polygonal shape;
wherein an outer shape of the reinforcing member is substantially a same shape as the polygonal shape of the mounting hole; and
wherein an opening end face of the reinforcing member, which faces the bearing surface of the mounting target member, is inclined so as to be on the same plane with the mounting surface of the mounting portion.

2. The mounting structure according to claim 1, wherein the mounting portion has a rear face which is opposite to the mounting surface; and
wherein the mounting surface is inclined with respect to the rear face.

3. The mounting structure according to claim 1, wherein the outer shape of the reinforcing member is a square.

4. The mounting structure according to claim 3, wherein the mounting portion has a thin part and a thick part which are adjacent to the mounting hole, the mounting hole being arranged between the thin part and the thick part;
wherein the opening end part of the reinforcing member, which faces the bearing face of the mounting target portion, has a first opening end face, a second opening end face being opposed to the first opening end face through the insertion hole, a third opening end face, and a fourth opening end face, the third opening end face and the fourth opening end face being respectively connected to both end portions of the first opening end face and both end portions of the second opening end face;
wherein the first opening end face is same in height as a position of the mounting surface on the thick part of the mounting portion;
wherein the second opening end face is same in height as a position of the mounting surface on the thin part of the mounting portion, the second opening end face being lower than the first opening end face; and
wherein the third and fourth opening end faces are inclined downward in a direction toward the second opening end face from the first opening end face.

5. The mounting structure according to claim 1, wherein an outer dimension of the reinforcing member is greater than an inner dimension of the mounting hole of the mounting portion.

6. The mounting structure according to claim 1, wherein the reinforcing member is embedded in the mounting portion, and is integrally formed in the mounting portion.

7. The mounting structure according to claim 1, wherein the reinforcing member is comprised of metal material.

8. The mounting structure according to claim 1, wherein the reinforcing member includes four exterior sides, each of the sides being substantially defined by a single plane.

9. The mounting structure according to claim 8, wherein the four exterior sides of the reinforcing member are each completely defined by a single plane.

10. The mounting structure according to claim 8, wherein the planes that define the four exterior sides of the reinforcing member each extend parallel to corresponding sides of the mounting hole.

11. The mounting structure according to claim 1, wherein the insertion hole of the reinforcing member is rectangular.

12. The mounting structure according to claim 1, wherein the insertion hole of the reinforcing member is formed by four surfaces that are each defined by a single plane.

13. The mounting structure according to claim 12, wherein the reinforcing member includes a flange, and the planes that define the four surfaces of the insertion hole are perpendicular to the flange.

14. The mounting structure according to claim 1, wherein a bottom of the reinforcing member is open.

15. The mounting structure according to claim 14, wherein the reinforcing member is configured to enable the fastening member to project beyond the bottom thereof.

16. The mounting structure according to claim 1, wherein the reinforcing member includes a plurality of planar sides.

17. The mounting structure according to claim 16, wherein the reinforcing member is defined by four planar sides.

18. The mounting structure according to claim 16, wherein each of the planar sides varies in a length direction with respect to another of the planar sides.

19. The mounting structure according to claim 18, wherein the reinforcing member is defined by four planar sides.

20. The mounting structure according to claim 1, wherein the reinforcing member includes a first pair of planar sides and a second pair of planar sides, and the first pair of planar sides oppose one another and have unequal lengths while the second pair of planar sides oppose one another and have equal lengths.

* * * * *